United States Patent
Eliash et al.

(10) Patent No.: US 11,126,368 B2
(45) Date of Patent: Sep. 21, 2021

(54) SYSTEMS AND METHODS FOR FINDING A LAST GOOD PAGE IN NAND OPEN BLOCK

(71) Applicant: Western Digital Technologies, Inc., San Jose, CA (US)

(72) Inventors: Tomer Eliash, San Jose, CA (US); Evgeny Mekhanik, San Jose, CA (US); David Rozman, San Jose, CA (US); Yair Chasdai, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 209 days.

(21) Appl. No.: 16/398,591

(22) Filed: Apr. 30, 2019

(65) Prior Publication Data
US 2020/0348880 A1    Nov. 5, 2020

(51) Int. Cl.
*G06F 3/06* (2006.01)
*G06F 13/16* (2006.01)

(52) U.S. Cl.
CPC ............ *G06F 3/0653* (2013.01); *G06F 3/064* (2013.01); *G06F 3/0619* (2013.01); *G06F 3/0659* (2013.01); *G06F 3/0679* (2013.01); *G06F 13/1668* (2013.01)

(58) Field of Classification Search
CPC .... G06F 3/0619; G06F 3/0653; G06F 3/0659; G06F 3/0679; G06F 13/1668; G06F 3/064
USPC ......................................... 711/103, E12.008
See application file for complete search history.

(56) References Cited

U.S. PATENT DOCUMENTS

| | | | |
|---|---|---|---|
| 2011/0213913 A1* | 9/2011 | Yao | G06F 12/0246 711/103 |
| 2014/0006683 A1 | 1/2014 | Ratn et al. | |
| 2015/0261613 A1 | 9/2015 | Tuers et al. | |
| 2016/0180945 A1 | 6/2016 | Ng et al. | |
| 2016/0343448 A1* | 11/2016 | Gueta | G06F 13/1668 |
| 2017/0139784 A1* | 5/2017 | Ke | G06F 3/065 |
| 2018/0018111 A1* | 1/2018 | Byun | G06F 3/0679 |
| 2018/0107412 A1* | 4/2018 | Jun | G06F 3/065 |

FOREIGN PATENT DOCUMENTS

KR    1020150003577 A    1/2015

OTHER PUBLICATIONS

International Search Report and Written Opinion, PCT/US2019/066145, dated Sep. 3, 2020.

* cited by examiner

*Primary Examiner* — Sanjiv Shah
*Assistant Examiner* — Edward Waddy, Jr.
(74) *Attorney, Agent, or Firm* — Dickinson Wright PLLC; Steven Hurles

(57) ABSTRACT

A method for finding a last good page in a memory system includes determining a first number of write operations in a first queue at a first page in a memory block of the memory system. The method also includes determining whether the first number of write operations in the first queue is above a threshold. The method also includes based on a determination that the first number of write operations in the first queue is above the threshold, determining whether a second page in the memory block is empty. The method also includes identifying, based on a determination that the second page is empty, the last good page in the memory block using a binary search between the first page and the second page.

16 Claims, 9 Drawing Sheets

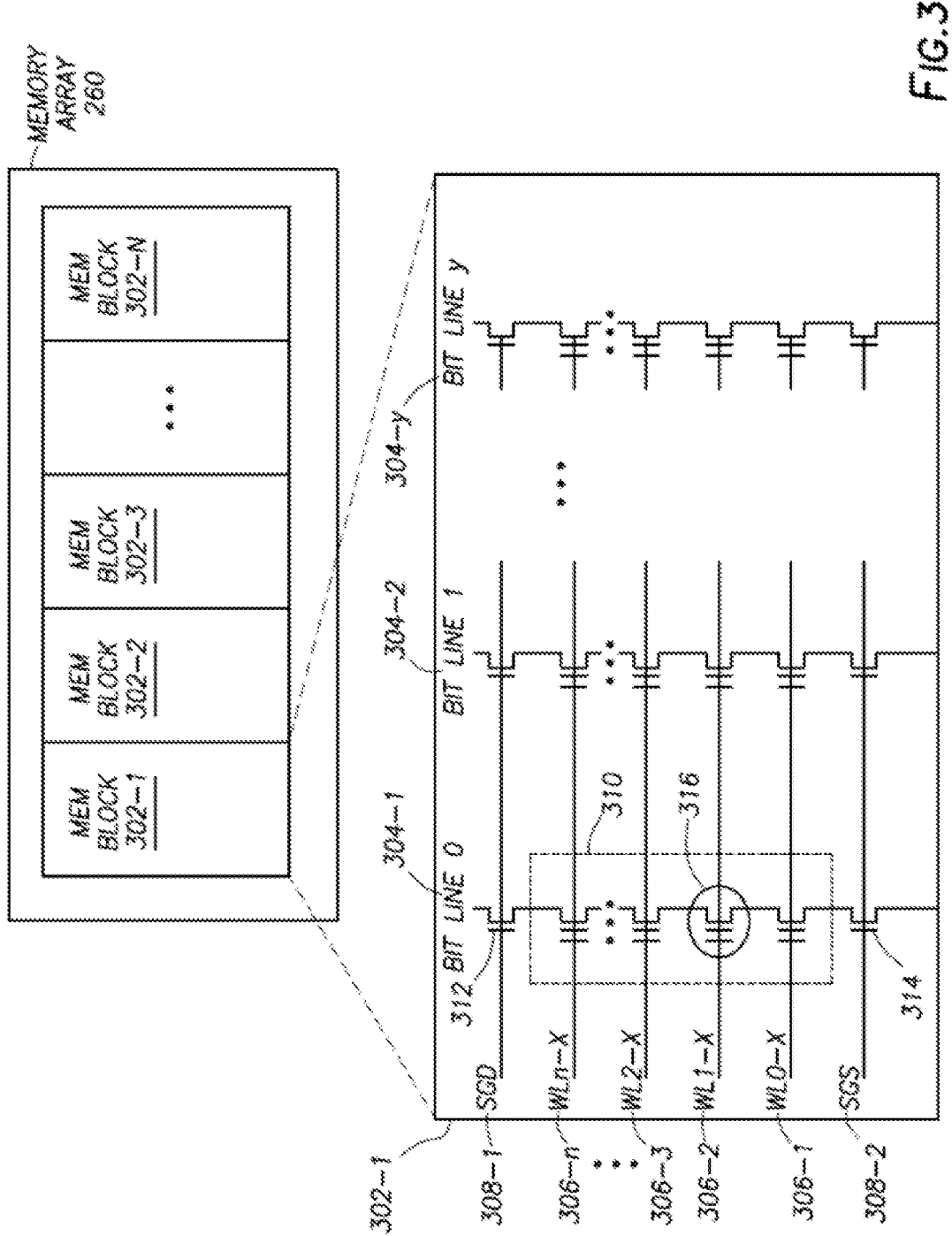

SYSTEMS AND METHODS FOR FINDING A LAST GOOD PAGE IN NAND OPEN BLOCK

TECHNICAL FIELD

This disclosure relates to memory systems, and in particular to methods and systems of finding a last good page in a NAND open block.

BACKGROUND

Non-volatile memory systems are a type of memory that retains stored information without requiring an external power source. Non-volatile memory is widely used in various electronic devices and in stand-alone memory devices. For example, non-volatile memory can be found in laptops, digital audio player, digital cameras, smart phones, video games, scientific instruments, industrial robots, medical electronics, solid state drives, USB drives, memory cards, and the like. Non-volatile memory can be electronically programmed/reprogrammed and erased.

Typically, a memory system includes one or more memory dies. Each of the one or more memory dies includes one or more memory planes, each consisting of a plurality of memory blocks. During programming of the memory system, a controller of the memory system performs operations (e.g., read operations, write operations, other suitable operations, or a combination thereof) on pages of a memory block according to commands received by the controller. When the controller completes all operations for the memory block, the controller stores information in persistent memory indicating that programming of the memory block is complete. The controller may then begin performing operations on pages of another memory block of the memory system and may continue performing operations on pages of each memory block of the memory system until programming of the memory system is complete.

During programming, power to the memory system may be lost, which may interrupt programing of the memory system. When power is restored to the memory system, the controller may find a last good page of the memory system. The last good page includes a last page written by the controller prior to power to the memory system being lost. The controller may use the information stored in persistent memory to identify the memory block that was being programmed before power to the memory system was lost. Typically, the controller performs a binary search on the memory block that was being programed before power to the memory system was lost in order to find the last good page of the memory block.

SUMMARY

This disclosure relates generally to memory management systems and methods.

An aspect of the disclosed embodiments is a method for finding a last good page in a memory system. The method includes determining a first number of write operations in a first queue at a first page in a memory block of the memory system. The method also includes determining whether the first number of write operations in the first queue is above a threshold. The method also includes based on a determination that the first number of write operations in the first queue is above the threshold, determining whether a second page in the memory block is empty. The method also includes identifying, based on a determination that the second page is empty, the last good page in the memory block using a binary search between the first page and the second page.

Another aspect of the disclosed embodiments is a memory system that includes a non-volatile storage having an array of memory blocks and a controller in communication with the memory blocks. The controller is configured to: determine a first number of write operations in a first queue at a first page in a memory block of the memory blocks determine whether the first number of write operations in the first queue is above a threshold; based on a determination that the first number of write operations in the first queue is above the threshold, determine whether a second page in the memory block is empty; and identify, based on a determination that the second page is empty, the last good page in the memory block using a binary search between the first page and the second page.

Another aspect of the disclosed embodiments is a method for finding a last good page for each memory die in a memory system having multiple memory dies. The method includes determining a first number of write operations in a first queue at a first page in a first memory block of a first memory die. The method also includes determining whether the first number of write operations in the first queue is above a threshold. The method also includes based on a determination that the first number of write operations in the first queue is above the threshold, determining whether a second page in the first memory block of the first memory die is empty. The method also includes based on a determination that the second page is empty, identifying a last good page in the first memory block of the first memory die using a binary search between the first page and the second page. The method also includes based on a determination that the second page is not empty, identifying the last good page in the first memory block of the first memory die using a second number of write operations in a second queue at the second page in the first memory block of the first memory die. The method also includes identifying a last good page in a second memory block of a second memory die using the last good page in the first memory block of the first memory die and a delta number of pages.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 generally illustrates a memory block according to the principles of the present disclosure.

DETAILED DESCRIPTION

Figure 1A:
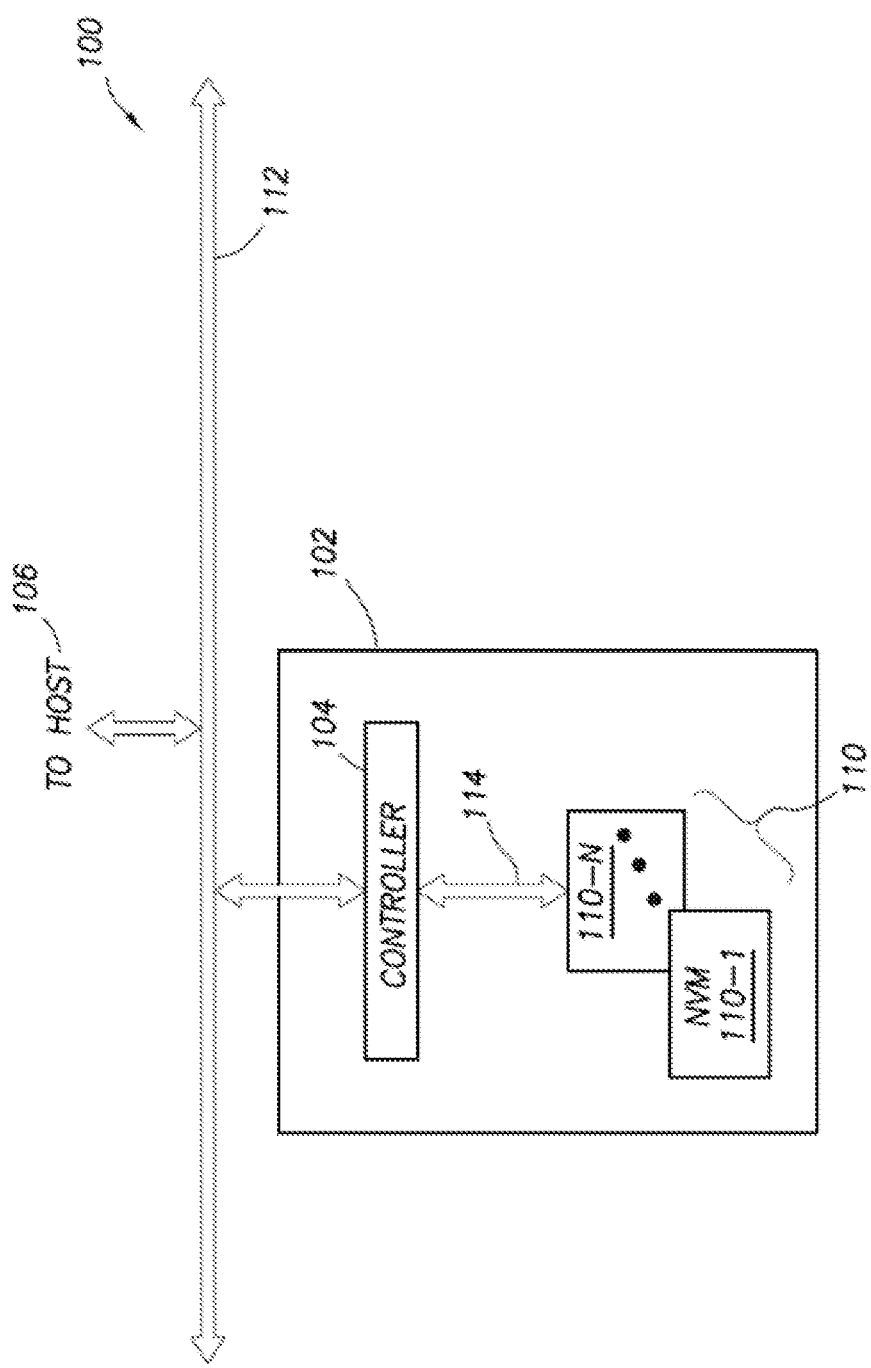
FIGS. 1A-1B generally illustrates a block diagram of an example non-volatile memory system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, non-volatile memory systems are a type of memory that retains stored information without requiring an external power source. Non-volatile memory is widely used in various electronic devices and in stand-alone memory devices. For example, non-volatile memory can be found in laptops, digital audio player, digital cameras, smart phones, video games, scientific instruments, industrial robots, medical electronics, solid state drives, USB drives, memory cards, and the like. Non-volatile memory can be electronically programmed/reprogrammed and erased.

Typically, a memory system includes one or more memory dies. For example, the memory system may include 4 memory dies, 8 memory dies, 16 memory dies, 32 memory dies, or any suitable number of memory dies. Each of the one or more memory dies includes one or more memory planes, each consisting of a plurality of memory blocks. Memory blocks of each of the one or more memory dies may be bound to the same logical entity (e.g., a meta block), which may be programmed, reprogrammed, and/or erased at the same or substantially the same time.

During programming of the memory system, a controller of the memory system performs operations according to commands received by the controller (e.g., from a host associated with the memory system) on pages of a memory block. For example, the controller may perform a write operation on a page of a first memory block of a first memory plane of a first memory die according to the commands. The controller may then continue to perform operations on subsequent pages of the first memory block until programming of the first memory block is complete. When the controller completes all operations for a memory block (e.g., the first memory block), the controller stores information in persistent memory indicating that programming of the memory block is complete. The controller then continues to program other memory blocks of the first memory plane and memory blocks of each memory plane of the first memory die and for each memory plane of each other memory die in the memory system according to the commands received by the controller.

Typically, in order to maintain high performance and reduce the amount of write access to the memory system, the controller may store a memory address of the next page to write in random access memory (RAM) associated with the memory system. However, during programming, power to the memory system may be lost, which may interrupt the controller while the controller is performing operations on a page of a memory block (e.g., a second memory block). Additionally, or alternatively, the information stored in RAM, such as the memory address of the next page to write and/or various memory management tables, may be lost. Accordingly, the controller may rebuild the lost management tables and find the next page to write when power is restored to the memory system. For example, the controller may find a last good page of the memory system in order to continue programming (e.g., continuing performing operations according to the commands). The last good page includes a last page written by the controller prior to power to the memory system being lost.

The controller may use the information stored in persistent memory to identify the memory block that was being programmed before power to the memory system was lost. For example, as described, the controller stores in persistent memory information indicating that programming of a memory block is complete. The information may include a memory address and/or other suitable information. The controller may retrieve from persistent memory the memory address of last memory block to be programmed (e.g., the first memory block). The controller then jumps to the memory block following the last memory block to be programmed (e.g., the second memory block). That is, the controller uses the memory address of the last memory block to be programmed to identify the memory block that was being programmed when the power to the memory system was lost.

Typically, the controller performs a binary search (e.g., O(log N)) on the memory block (e.g., the second memory block) that was being programed before power to the memory system was lost, in order to find the last good page of the memory block. For example, the controller may determine whether a first page having a memory address located at or near a middle of the memory addresses of the second block is empty. When the controller determines that the first page is empty (e.g., was not written before the power to the memory was lost), the controller determines whether a page having a memory address located between a first memory address of the second memory block and the memory address corresponding to the first page is empty. Conversely, when the controller determines that the first page is not empty (e.g., was written before the power to the memory system was lost), the controller determines whether a page having a memory address located between the memory address corresponding to the first page and the last memory address of the second memory block is empty.

The controller continues in this manner until the controller finds the last good page in the second block (e.g., the last page written before power to the memory system was lost). The controller may then continue performing operations, according to the commands received by the controller, on the page next to the last good page written before power to the memory system was lost (e.g., the controller continues where the controller left off before the power to the memory system was lost).

While using a binary search may be effective for finding the last good page, as the number of pages, memory blocks, memory planes, and memory dies continue to increase in memory systems, using such a binary search may be suboptimal, which may contribute to an increased system boot time. Accordingly, systems and methods, such as the systems and methods described herein, that efficiently find the last good page of a memory block, may be desirable. In some embodiments, the systems and methods described herein are configured to store information in a pager header of a page being written by the controller. The information may include a value that represents a number of write operations remaining in a queue of operations to be performed by the controller. In some embodiments, the information may include error detection information, error correction information, and/or other suitable information.

In some embodiments, the systems and methods described herein are configured to, in the case of an unexpected power loss (e.g., ungraceful shut down (UGSD)) to the memory system, find a last good page of a memory block using the information stored in persistent memory and the page header information. For example, the systems and methods described herein may be configured to identify a memory block that was being programmed when the power to the memory system was lost using the information in persistent memory. The systems and methods described herein, as will be described, may use the value that represents the number of write operations in the queue to search for the last good page of the memory block. For example, the systems and methods described herein may determine the number of write operations in the queue at a first page of the memory block. The systems and methods described herein may be configured to jump to a second page using the number of write operations in the queue. The systems and methods described herein may continue to search pages in the memory block using a number of write operations in the queue at respective pages of the memory block until the systems and methods find the last good page of the memory block.

In some embodiments, the memory system may include one or more memory planes. The systems and methods described herein may find a last good page for a memory block associated with a first memory plane and use the last good page of the memory block associated with the first memory plane to find a last good page in another memory block associated with a second memory plane. The systems and methods described herein may continue using the last good page of the memory block of the first memory plane to find subsequent last good pages for other memory blocks of other memory planes.

In some embodiments, the memory system may include a plurality of memory dies. The systems and methods described herein may find a last good page for a memory block associated with a first memory die and use the last good page of the memory block associated with the first memory die to find a last good page in another memory block associated with a second memory die. The systems and methods described herein may continue using the last good page of the memory block of the first memory die to find subsequent last good pages for other memory blocks of other memory dies. The systems and methods described herein may improve finding the last good page for a memory block by using the number of write operations in the queue, which may improve, among other things, system boot time. The specification now turns to an example computer architecture that utilizes memory, in accordance with example embodiments.

FIG. 1A illustrates a block diagram of an example system architecture 100 including non-volatile memory. In particular, the example system architecture 100 includes storage system 102 (e.g., which may be referred to as a memory system), a controller 104, and a host 106. In various embodiments, the host 106 can include any device or system that utilizes the storage system 102. In some embodiments, various aspects of the controller 104 may be implemented by the host 106 or the host 106 can include its own controller (e.g., a processor) configured to execute instructions stored in the storage system 102 and further the host 106 can access data stored in the storage system 102.

Examples of the host 106 include computing devices such as a desktop computer, rack mounted server, a laptop, a smartphone, a tablet, or other suitable computing devices. Host 106 can also include systems and devices such as a gaming system, a digital phone, a digital camera (e.g., digital still cameras and digital movie cameras), portable media player, digital photo frame, remote control, television stick, smart television, and the like. Furthermore, the system architecture 100 can be implemented in a memory card such as secure digital (SD) card or a micro secure digital (micro-SD) card. In some embodiments, the system architecture 100 is embedded in the host, for example as a solid state disk (SSD) drive installed in a laptop computer.

In embodiments where the system architecture 100 is implemented within a memory card, the host 106 can include a built-in receptacle for one or more types of memory cards or flash drives (e.g., a universal serial bus (USB) port, or a memory card slot). Additionally, or alternatively, the host 106 can include adapters into which a memory card may be plugged. The foregoing examples of a host are not meant to be limiting examples. On the contrary, a host 106 can include any type of device, system, and apparatus that accesses the storage system 102.

In FIG. 1A, the storage system 102 includes a memory controller and drivers (e.g., controller 104)—as will be described further below—however, in some embodiments of the storage system 102, the storage system 102 may include memory-only units that are instead controlled by software executed by a controller on the host 106 (e.g., a processor of a computing device controls, including error handling of, the storage system 102). Furthermore, although FIG. 1A illustrates the storage system 102 as separate from the host 106, in some embodiments, the storage system 102 is embedded with the host 106, where the memory, controller, and drivers are formed on a single integrated circuit chip.

The host 106 can communicate with the storage system 102 using of a bus 112 that implements any known or after developed communication protocol that enables the storage system 102 and the host 106 to communicate. The communication protocol may include Secure Digital (SD) protocol, Memory stick (MS) protocol, USB protocol, Advanced Microcontroller Bus Architecture (AMBA), or other suitable communication protocol.

In various embodiments, the controller 104 acts as an interface between the host 106 and the storage system 102. The host 102 may communicate with the controller 104 via a bus interface associated with the bus 112. The controller 104 can include individual circuit components, processing circuitry (e.g., logic gates and switches), a processor, a microprocessor, a microcontroller with controlling software, or a field programmable gate array (FPGA). Furthermore, the example controller 104 includes a computer-readable medium that stores computer-readable program code (e.g., software or firmware) executable by the processor. In some embodiments, the controller 104 is a flash memory controller. In some embodiments, the controller 104 is a processor executing within the host 106.

Still referring to FIG. 1A, according to some embodiments, the controller 104 acts as an interface between the host 106 and the storage system 102 and manages data stored on the storage system 102. For example, the host 106 can access data stored in the storage system 102 by providing a logical address, via the bus interface associated with the bus 112, to the controller 104, which, the controller 104 converts to a physical address. The controller 104 can access data and/or a particular storage location associated with the physical address and facilitate transferring data between the storage system 102 and the host 106. In some embodiments, where the storage system 102 includes flash memory, the controller 104 formats the flash memory to ensure the memory is operating properly, maps out bad flash memory cells, and allocates spare cells to be substituted for future failed cells or used to hold firmware to operate the flash memory controller (e.g., the controller 104).

Accordingly, the controller 104 performs various memory management functions such as wear leveling (e.g., distributing writes to extend the lifetime of the memory blocks), garbage collection (e.g., moving valid pages of data to a new block and erasing the previously used block), and error detection and correction (e.g., read error handling).

Still referring to FIG. 1A, the storage system 102 includes the non-volatile memory (NVM) block 110 which may include several memory die 110-1-110-N. In some embodiments, the NVM block 110 defines a physical set of memory die, such as the memory die 110-1-110-N. In other embodiments, the NVM block 110 defines a logical set of memory die, where the NVM block 110 includes memory die from several physically different sets of memory die. The manner in which the NVM block 110 is defined in FIG. 1A is not meant to be limiting.

Each memory die, for example memory die 110-1, includes non-volatile memory cells, such as NAND flash memory cells, NOR flash memory cells, or other suitable memory cells. As the memory cells are non-volatile, the memory cells in the storage system 102 retain data even when there is an interruption in power supplied to the memory cells and/or the storage system 102. Thus, the storage system 102 can be easily transported and the storage system 102 can be used in memory cards and other memory devices that are not always connected to a power supply.

In various embodiments, the memory cells in the memory die 110 are solid-state memory cells (e.g., flash) and are one-time programmable, few-time programmable, or many time programmable. Additionally, the memory cells in the memory die 110 can include single-level cells (SLC), multiple-level cells (MLC), or triple-level cells (TLC). In some embodiments, the memory cells are fabricated in a planar manner (e.g., 2D NAND (NOT-AND) flash) or in a stacked or layered manner (e.g., 3D NAND flash). That is, planar flash memory includes a single layer of memory cell, while stacked flash memory includes memory cells that are stacked vertically in multiple layers (e.g., referred to as planes).

In some embodiments, and as shown in FIG. 1A, the controller 104 and the NVM block 110 are communicatively coupled by an interface 114 that implements any known or after developed communication protocol. In embodiments where the storage system 102 is flash memory, the interface 114 is a flash interface, such as Toggle Mode 200, 400, or 800, or Common Flash Memory Interface (CFI). In various embodiments, the interface 114 can be implemented by several channels (i.e., physical connections) disposed between the controller 104 and the individual memory die 110-1-110-N. Furthermore, the number of channels over which the interface 114 is established varies based on the capabilities of the controller 104. Additionally, a single channel can be configured to communicatively couple more than one memory die. The depiction of a single interface 114 is not meant to be limiting. To the contrary, the single interface is representative of an example interface that can be used between components, and one or more interfaces can be used to communicatively couple the same components.

Figure 1B:
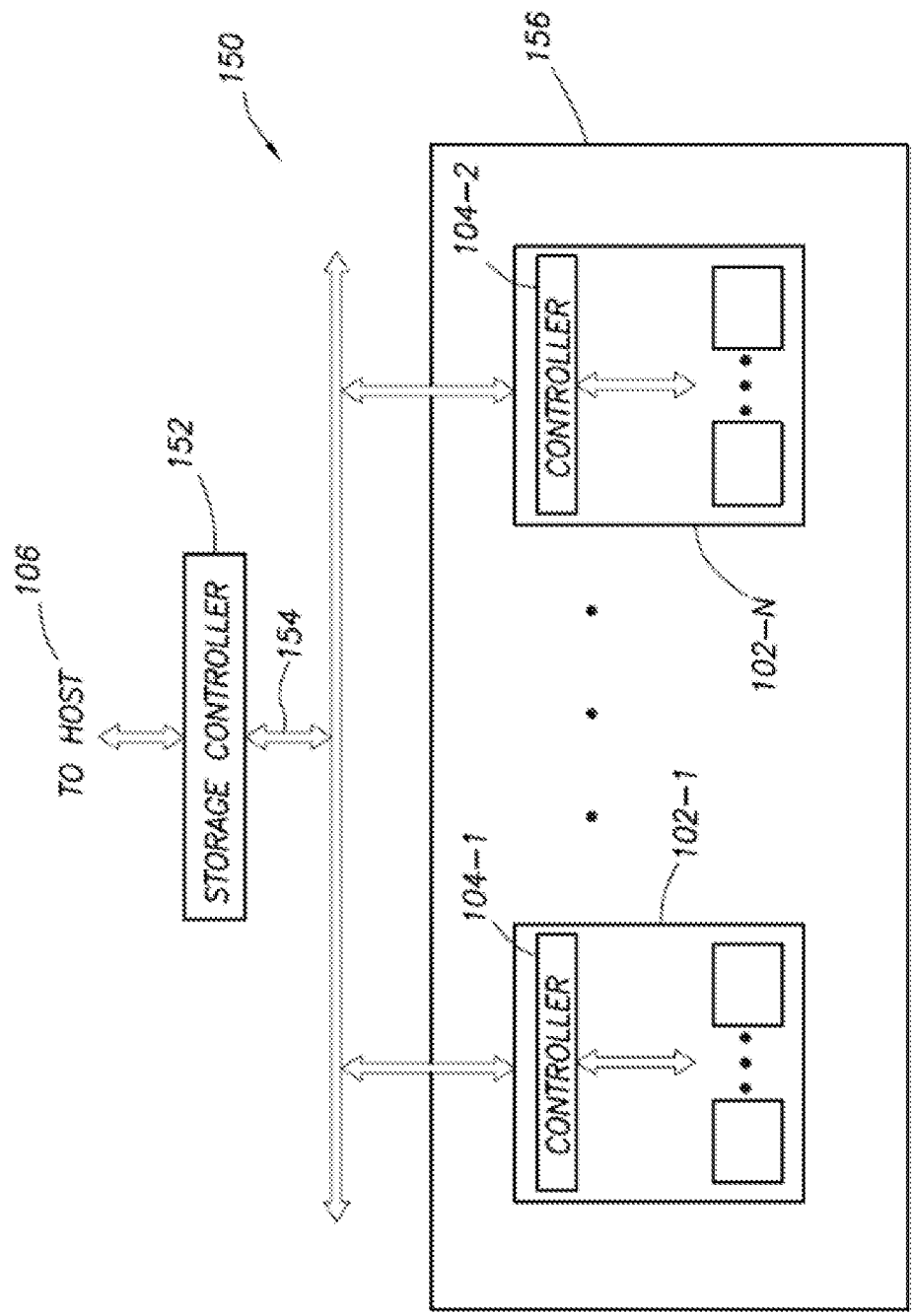

FIG. 1B generally illustrates a block diagram of a system architecture 100 according to the principles of the present disclosure. The system architecture 100 can be implemented as part of a larger system architecture. For example, as shown in FIG. 1B, the system architecture 150 includes a storage module 156 that further includes several storage systems 102. Within the example system architecture 150 the storage module 156 is communicatively coupled with the host 106 by way of a storage controller 152. In particular, an interface 154 between the host 106 and the storage module 156 includes a bus interface that implements any known or after developed communication protocol, such as a serial advanced technology attachment (SATA) or peripheral component interface express (PCIe) interface. In some embodiments, the storage module 156 is an SSD (e.g., in a laptop computer or a tablet).

Some implementations of the system architecture 100 include a hierarchical storage system. A hierarchical storage system can include a plurality of storage controllers 152, each of which control a respective storage system 102. Furthermore, a plurality of hosts 106 can each access the hierarchical storage system. Hosts 106 can access memories within the hierarchical storage system via a bus interface that implements any known or after developed communication protocol including a non-volatile memory express (NVMe) or a fiber channel over Ethernet (FCoE) interface. The hierarchical storage system can be implemented as a rack mounted storage system that is accessible by multiple host computers (e.g., a data center).

The interface 154 can be implemented by several channels (i.e., physical connections) disposed between the storage controller 152 and the storage module 156. In some embodiments, the number of channels over which an interface 154 is established varies based on the capabilities of the storage controller 152. The depiction of a single interface is not meant to be limiting and the single interface is representative of an example interface that can be used between components, where one or more interfaces can be used to communicatively couple various components.

Figure 2A:
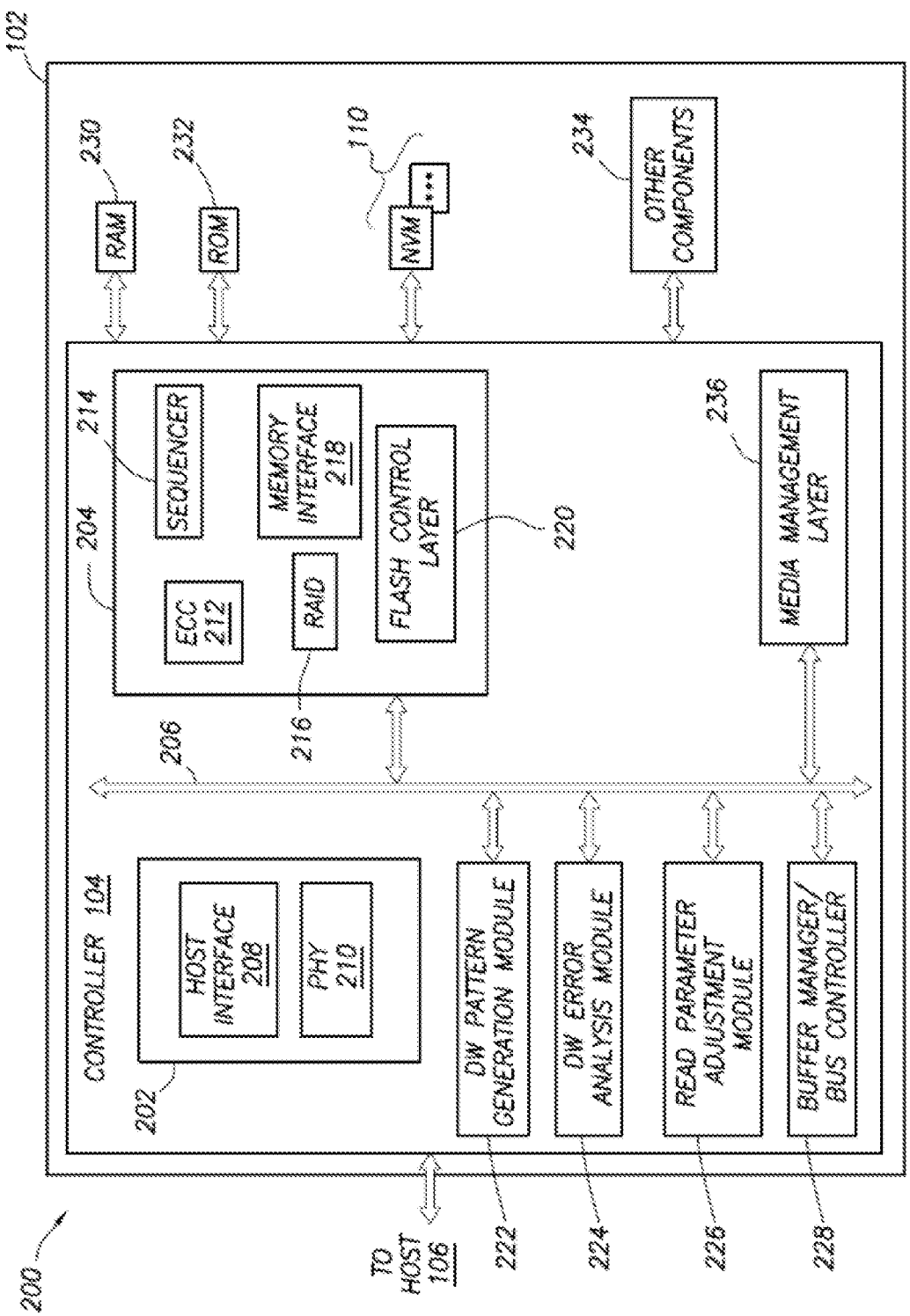
FIG. 2A generally illustrates a block diagram of example components of a controller according to the principles of the present disclosure.

FIG. 2A generally illustrates a block diagram 200 of the storage system 102, according to the principles of the present disclosure. The block diagram 200 of the storage system 102 includes components previously described in FIG. 1A, such as the controller 104 and the NVM memory block 110. Additional components that can be present within the storage system 102 include a random access memory (RAM) 230, a read only memory (ROM) 232, and other components 234. In some embodiments, the ROM 232 stores system boot code.

Although the RAM 230 and the ROM 232 are shown as separate modules within the storage system 102, the illustrated architecture is not meant to be limiting. For example, the RAM 230 and the ROM 232 can be located within the controller 104. In some embodiments, portions of the RAM 230 or ROM 232, respectively, are located outside the controller 104 and within the controller 104. In other embodiments, the controller 104, the RAM 230, and the ROM 232 can be located on separate semiconductor die. In various embodiments, the other components 234 include external electrical interfaces, external RAM, resistors, capacitors, logic gates, or other components that interface with the controller 104.

In some embodiments, the controller 104 includes a module 202 that interfaces with the host 106, a module 204 that interfaces with the NVM memory block 110, as well as various other modules, described further below. The modules within the controller (e.g., modules 202 and 204) are communicatively coupled to each other by a bus 206.

The following discussion of the various modules depicted within the controller 104 are meant to be illustrative and not limiting. For example, the various modules generally illustrated in FIG. 2A are not limited to being executed within the controller 104, and in some embodiments, one or more modules can be executed outside the controller 104.

The module 202 interfaces with the host 106 and includes a host interface 208 and a physical layer interface 210 that provides the electrical interface between the host 106 or next level storage controller and the controller 104. The host interface 208 facilitates transferring of data, control signals, and timing signals. Examples of the host interface 208 include SATA, SATA express, Serial Attached SCSI (SAS), Fibre Channel, USB, PCIe, and NVMe.

Still referring to FIG. 2A, in various embodiments, the module 204 is configured to communicate with the NVM block 110 and includes an error correcting code (ECC) engine 212. In some embodiments, the ECC engine 212 encodes data received from the host 106 and stores the encoded data in the NVM block 110. When the data is read out from the NVM memory block 110, the ECC engine 212 decodes the data and corrects errors detected within the data. To detect errors, the ECC engine 212 implements various types of error checking using algorithms such as low-density parity-check (LDPC) code, Bose-Chaudhuri-Hocquenghem (BCH) code, a soft read, and/or extra parity.

The example module 204 also includes a sequencer 214 and a Redundant Array of Independent Drives (RAID) module 216. In various embodiments, the sequencer 214 generates command sequences, such as program and erase command sequences that are transmitted to the NVM memory block 110. The RAID module 216 generates RAID parity and recovery of failed data. The RAID parity can be used to provide an additional level of integrity protection for data written into the NVM memory block 110. In some embodiments, the ECC engine 212 implements the functions of the RAID module 216.

The example module 204 also includes a memory interface 218 that provides the command sequences to the NVM memory block 110 and receives status information from the NVM memory block 110. For example, the memory interface 218 implements any known or after developed communication protocol including a double data rate (DDR) interface, such as a Toggle Mode 200, 400, or 800 interface. The module 204 also includes a flash control layer 220 that controls the overall operation of the module 204.

Still referring to example modules within the controller 104 in FIG. 2A, additional modules within the controller 104 includes a dummy word line (DW) pattern generation module 222, a DW error analysis module 224, and a read parameter adjustment module 226. Dummy word lines are placed on non-volatile memory die that are used for the purposes of analyzing and tracking behavior and health of a respective non-volatile memory die. In various embodiments, the DW pattern generation module 222 puts a known data pattern into a dummy word line and tracks or periodically check for errors by reading the data back out of the dummy word line and comparing the data to the known data pattern.

In various embodiments, the read parameter adjustment module 226 adjusts parameters associated with a particular non-volatile memory die. For example—and as discussed further below—the read parameters adjustment module 226 can adjust parameters associated with a particular non-volatile memory die during an operation—i.e., a read or write—to adjust or re-adjust the read parameters. During the operation to re-adjust the read parameters, the read parameter adjustment module 226 adjusts the read parameters for a particular memory block, reads data out of the memory block, and verifies a resulting BER. If the resulting BER falls at or below a target or expected BER, the read parameters adjustment module 226 stores the read parameters for the memory block. Subsequently, the stored read parameters are used during a read of any word line within the memory block. Thus, read parameters can be unique to a memory block.

Additional modules within the example controller 104 include a buffer manager/bus controller 228 that manages, for example, buffers in the RAM 230 and controls the internal bus arbitration of the bus 206 in the controller 104. Additionally, or alternatively, the controller 104 can include a media management layer 236 that performs wear leveling of the NVM memory block 110. As previously mentioned, the various modules described with respect to the controller 104 are not meant to be limiting as to the architecture of the controller 104. For example, the physical layer interface 210, the RAID module 216, the media management layer 236, and the buffer management/bus controller 228 can be examples of optional components within the controller 104.

Furthermore, in embodiments where the storage system 102 includes flash memory, the media management layer 236 can be integrated as part of the flash management that handles flash error and interfaces with the host 106. In particular, the media management layer 236 can include an algorithm (e.g., firmware in the memory device), that translates a write command received from the host 106 into a write to the NVM memory block 110.

Figure 2B:
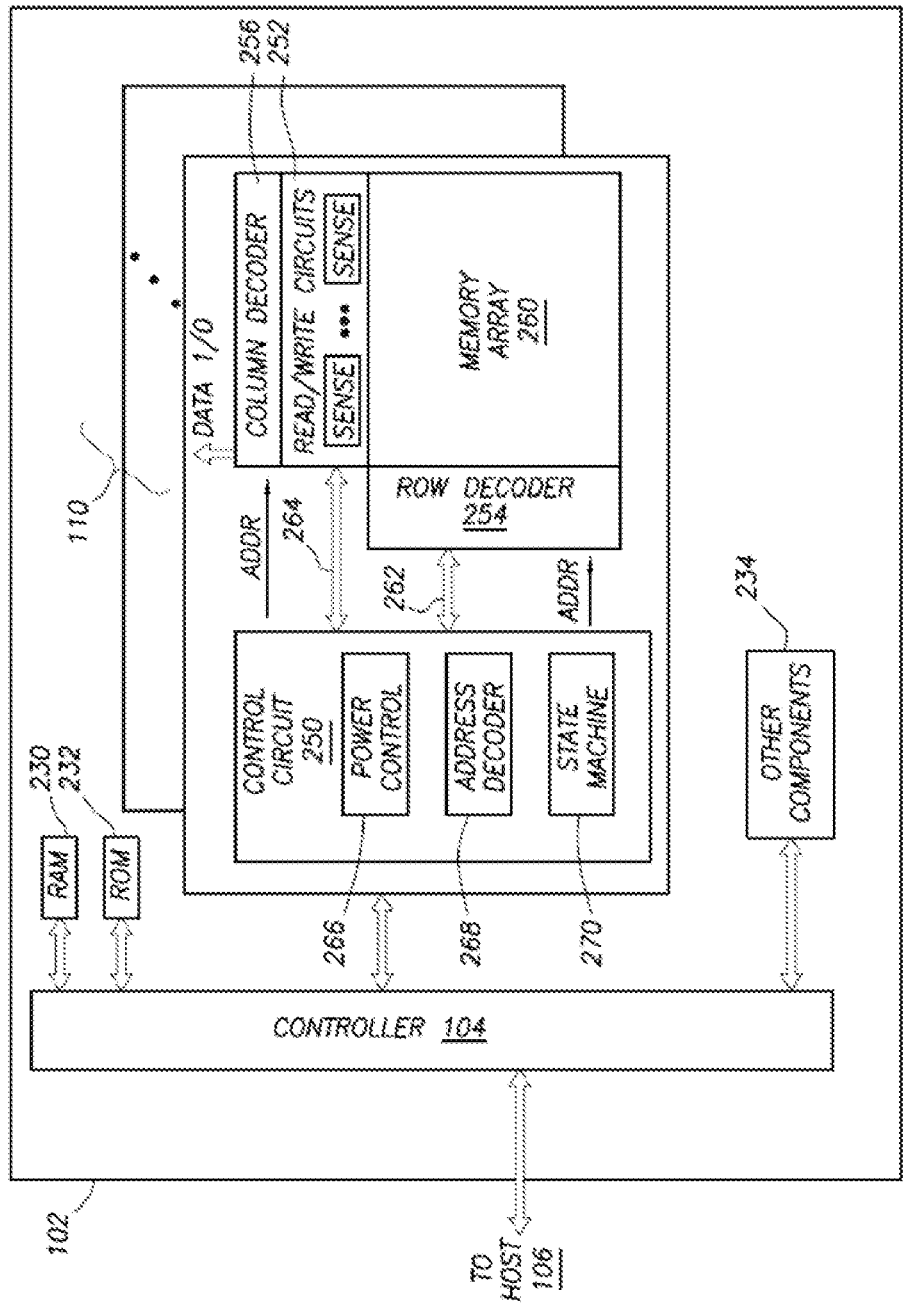
FIG. 2B generally illustrates a block diagram of example components of a non-volatile memory storage system according to the principles of the present disclosure.

FIG. 2B generally illustrates a block diagram with various features of the NVM memory block 110 within the storage system 102. As details of the controller 104 have been previously described (in FIG. 2A), in FIG. 2B the controller 104 is illustrated as a single block. Additionally, previously described RAM 230, the ROM 232, and the other components 234 are included in FIG. 2B to help orient the reader. Next, details within an example memory die 110-1 are discussed. Although the discussion centers on the memory die 110-1, each of the features discussed in relation to the memory die 110-1 equally applies to all of the memory dies within NVM memory block 110.

In some embodiments, the example memory die 110-1 includes control circuit 250, read/write circuits 252, a row decoder 254, a column decoder 256, and a memory array 260. The memory array 260 can include a two-dimensional array or a three-dimensional array of memory cells. The read/write circuits 252 read and program pages of memory within the memory die 110-1, in parallel. In various embodiments, the memory array 260 is accessed by word lines via the row decoder 254 and by bit lines via the column decoder 256.

The architecture of the memory die 110-1 is not meant to be limiting and any known architecture that can perform the functions of accessing the memory array 260 can be used without departing from the scope of this disclosure. For example, in various embodiments, access to the memory array 260 by various peripheral circuits can be implemented in a symmetric fashion on opposite sides of the memory array 260, which reduces the densities of access lines, and circuitry on each side of the memory array 260.

Still referring to FIG. 2B, in various embodiments, the example control circuit 250 includes a power control circuit 266, an address decoder 268, and a state machine 270. In some embodiments, the power control circuit 266, the address decoder 268, and the state machine 270 can be collectively referred to as managing circuits. The control circuit 250 and its various managing circuits are communicatively coupled by various interfaces (e.g., interfaces 262 and 264) to the row decoder 254 and the column decoder 256. In various embodiments, the control circuit 250 performs various operations on the memory array 260 that include reading or writing to the memory cells.

The power control circuit 266 controls the power and voltage supplied to the word lines and bit lines during operation of the memory array 260. The address decoder 268 provides an address interface that translates addresses between addresses provided by the host 106 and addresses used by the row decoder 254 and the column decoder 256. The example address decoder 268 converts an address provided by the host 106 to an address that is understood and compatible with a format used by the row decoder 254 and the column decoder 256. The state machine 270 provides chip-level control of memory operations.

Thus, the storage system 102 includes various components including the controller 104 and the NVM memory block 110, details of which have been described above in FIGS. 1A, 1B, 2A, and 2B. The discussion now turns to an example architecture of an example memory array 260 and in particular methods that can be performed to improve a performance of a read in the storage system 102.

FIG. 3 further illustrates the memory array 260. The memory array 260 is divided into several memory blocks 302. In flash memory, a memory block is defined as a unit of erase. That is, each memory block 302 includes a number of memory cells that are erased together or as a block. In some embodiments, the memory array 260 can be partitioned into any number of blocks, for example, the memory array 260 includes 1,024 blocks. Additionally, or alternatively, each of the memory blocks 302 can conceptually be divided into a number of pages defined as a unit of programming. In some embodiments, a page of data can be stored in one row of memory cells. Each page can include user data and overhead data, where the overhead data includes CC that has been calculated from the user data.

Each memory block 302, for example memory block 302-1, includes multiple bit lines 304, word lines 306, and select lines 308. Each bit line, for example bit line 304-1, is connected to several memory cells connected in series. More particularly, in an embodiment where each memory cell is a floating gate transistor, the floating gate transistors are connected in series to form a NAND string 310 (e.g., illustrated within the dashed box). Although four memory cells are shown in FIG. 3, the number of memory cells within the NAND string is not meant to be limiting. For example, 16, 32, 64, 128, or any other number of memory cells can be connected in a NAND string. Each respective bit line 304 is coupled to a respective NAND string within the block 302.

Still referring to FIG. 3, a method of reading data stored in a particular memory cell—e.g., memory cell 316—includes applying a voltage to the select lines 308 of the block 302, which in turn are coupled to respective NAND strings within the block 302, including the NAND string 310 the includes the memory cell 316. The voltage applied to the select lines 308 is greater than threshold voltages of the select transistors 312 and 314. The select transistor 312 is controlled by the select gate drain line (SGD) 308-1 and the select transistor 314 is controlled by the select gate source line (SGS) 308-2. Additionally, in order to read data in the memory cell 316, all other memory cells or unselected memory cells in the NAND string 319 are turned on (e.g., conducting current regardless of whether they are programmed or erased). The unselected memory cells have a read pass voltage—i.e., read parameters—applied to their respective word lines that turn on the unselected memory cells.

During the example read operation, various read compare levels—i.e., voltages—are applied to the word line 306-2 to determine the value stored in the memory cell 316. In some embodiments, the conduction current of the memory cell 316 is measured to determine the value stored within the memory cell 316. The method in which each memory cell is accessed and the number of memory cells accessed during a read or write varies. For example, all of the bit lines of the memory block 302-1 can be simultaneously programmed or read. In various embodiments, memory cells along a shared word line can be programmed at the same time (i.e., concurrently). In other embodiments, the bit lines can be divided into even bit lines and odd bit lines. In an odd/even bit line architecture, memory cells along a shared word line and connected to the odd bit lines are programmed at one time, while memory cells along a shared word line and connected to an even bit line are programmed at a different time.

Each time data is written to a memory block the data is processed by the ECC engine 212 which includes encoding the data (e.g., using a particular error correction code) and storing the encoded data in the memory block. When the data is read back out of the memory block, the data is processed by the ECC engine 212 which includes decoding the data, correcting errors (e.g., tracked as the BER), and returning the data to a user (by way of the controller 104). In some embodiments, the amount of time the ECC engine 212 takes to return data to the controller 104 is defined as the throughput time.

In some embodiments, the controller 104 performs data consolidation operations on the memory array 260. The controller 104 selects a source block from the memory block 302-1 to memory block 302-N of the memory array 260, for consolidation or compaction. For example, the controller 104 may select memory block 302-1 as the source block for consolidation or compaction. The memory block 302-1 may be referred to as the source block 302-1 throughout the example embodiments described herein. The source block 302-1 may include a plurality of memory fragments, such as 16 memory fragments or any suitable number of memory fragments. The memory fragments may include data written by the host 106 during a host write operation. The memory fragments may belong to respective logical groups and may be scattered or disorganized in the source block 302-1, such that memory fragments associated with the same logical group may not be sequentially stored or organized in the source block 302-1. Additionally, or alternatively, while some memory fragments include data written by the host 106 during a host write operation, other memory fragments scattered throughout the source block 302-1 may be blank (e.g., having been erased by the host 106 or the controller 104 or having not been written to by the host 106).

As described, the controller 104 is configured to program the memory blocks 302-1 to 302-N. For example, the controller 104 may perform operations on the memory blocks 302-1 to 302-N, such as read operations, write operations, other suitable operations, or a combination thereof. The controller 104 may program the memory blocks 302-1 to 302-N responsive to commands received from the host 106 instructing the controller 104 to read data from one or more pages of the memory blocks 302-1 to 302-N, to write data to one or more pages of the memory blocks 302-1 to 302-N, to perform other operations on pages of the memory blocks 302-1 to 302-N, or a combination thereof. Additionally, or alternatively, the commands received from the host 106 may include one or more memory addresses (e.g., logical address that the controller 104 converts to physical addresses, as described).

Figure 4:
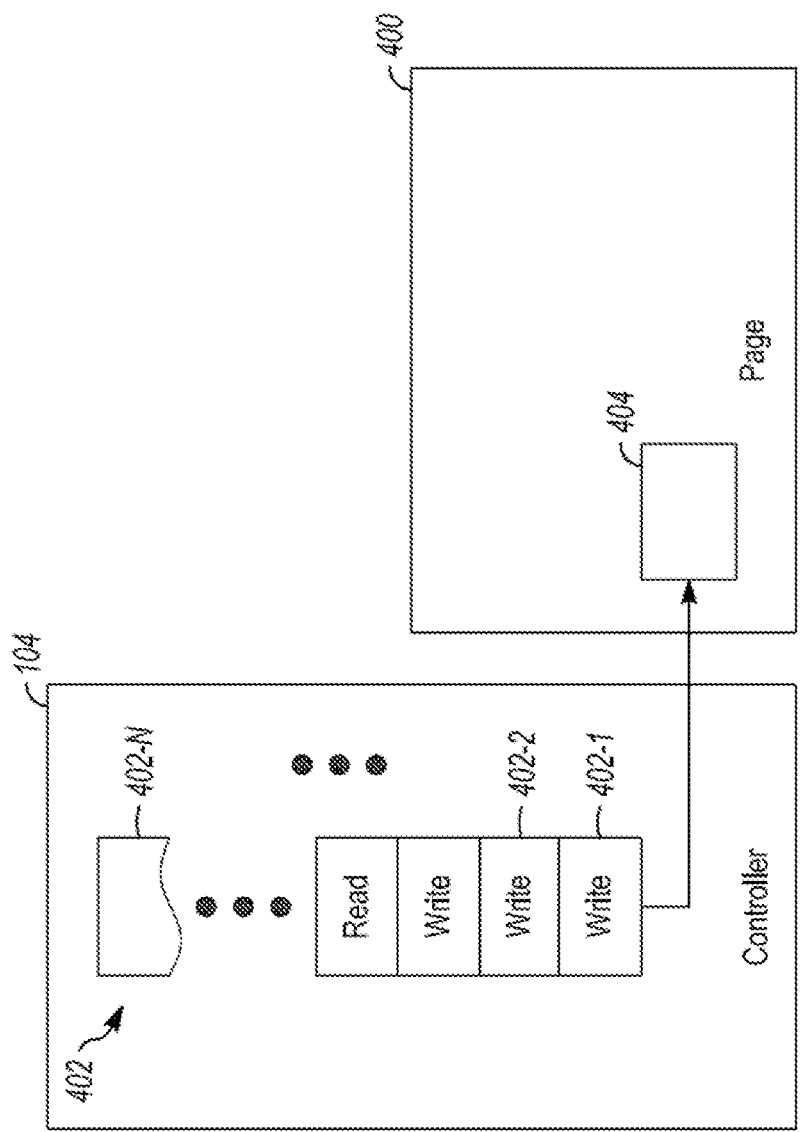
FIG. 4 generally illustrates an operations queue according to the principles of the present disclosure.

The controller 104 may include an operations queue 402 as is generally illustrate in FIG. 4. The controller 104 loads operations, corresponding to the commands from the host 106, into the queue 402. For example, as is generally illustrated, the queue 402 may include operations 402-1 to 402-N. The operations may include write operations, read operations, and/or other suitable operations. The controller 104 performs the operations in order according to the queue 402. For example, the controller 104 may access, using the memory address received from the host 106, a page 400 of a memory block, such as the memory block 302-1.

The controller 104 may perform the operation at 402-1 (e.g., a write operation) of the queue 402 on the page 400 of the memory block 302-1. For example, the controller 104 writes data to the page 400 according to the operation 402-1. The page 400 may include a page header 404. When the controller 104 completes performance of the operation 402-1 on the page 400, the controller 104 stores information in the page header 404. The information may include a value that represents a number of write operations remaining in the queue after the controller 104 performs the operation 402-1. Additionally, or alternatively, the information may also include error detection information, error correction information, other suitable information, or a combination thereof.

The controller 104 may then continue performing operations 402-2 to 402-N on subsequent pages of the memory block 302-1. For each subsequent page of the memory block 302-1, the controller 104 stores information indicating, at least, the value that represents the number of write operations remaining in the queue in page headers associated with respective pages.

When the controller 104 completes programming of the memory block 302-1 (e.g., by performing all operations corresponding to the pages of the memory block 302-1), the controller 104 stores information in persistent memory associated with the storage system 102 indicating that programming of the memory block 302-1 is complete. The information may include memory address information associated with the memory block 302-1, error detection information, error correction information, other suitable information, or a combination thereof.

The host 106 may continue to communicate commands to the controller 104. Accordingly, the controller 104 may populate the queue 402 with operations corresponding to commands received by the host 106. The controller 104 may continue to perform operations on pages of the memory block 302-1 and other memory blocks of the memory blocks 302-2 to 302-N until controller 104 completes all operations corresponding to the commands received from the host 106. The controller 104 may update the information stored in persistent memory when the controller 104 completes programming of each respective memory block 302-2 to 302-N. For example, when the controller 104 completes programming of the memory block 302-2, the controller 104 updates the information stored in persistent memory to indicate that programming of the memory block 302-2 is complete. The controller 104 may append the information stored in persistent memory or replace the information stored in persistent memory, such that only the most recent programmed memory block is indicated by the information.

In some embodiments, as described, the storage system 102 may include one or more memory planes. Each of the one or more memory planes includes a plurality of memory blocks. For example, a first memory plane may include the memory blocks 302-1 to 302-N and a second memory plane may include other memory blocks, and so on. The controller 104 may be configured to program, according to the commands received from the host 106, pages of memory blocks associated with each of the one or more memory planes.

In some embodiments, as described, the storage system 102 may include a plurality of memory dies 110-1 to 110-N. Each of memory dies 110-1 to 110-N may include one or more memory planes, each including one or more memory blocks. The controller 104 may be configured to program, according to the commands received from the host 106, pages of memory blocks associated with each memory plane of each of the memory dies 110-1 to 110-N.

During programming of the storage system 102, power to the storage system 102 may be lost. For example, an ungraceful shut down (UGSD) may occur, which may cause the controller 104 to be interrupted while the controller 104 is programming the storage system 102. In order to recover from the UGSD and continue programming where the controller 104 was interrupted by the UGSD, the controller 104 is configured to find a last good page during a boot up process of the storage system 102.

In some embodiments, the controller 104 uses the information stored in persistent memory and the information stored in page headers of respective pages in a memory block to find the last good page for the memory block. For example, the controller 104 retrieves the information from persistent memory indicating the last programmed memory block, such as the memory block 302-1, before the UGSD. The controller 104 may then access a memory block that immediately follows the memory block 302-1, such as the memory block 302-2 (e.g., the memory block being programmed before the UGSD).

The controller 104 then searches the pages of the memory block 302-2 in order to find the last good page (e.g., the last page written before UGSD) of the memory block 302-2. The controller 104 accesses a first page of the memory block 302-2. The first page may include a page of the memory block 302-2 having a memory address located at or near the middle of the memory addresses of the memory block 302-2, having a memory address located at or near the beginning of the memory addresses of the memory block 302-2, having a memory address located at or near the end of the memory addresses of the memory block 302-2, or other suitable page of the memory block 302-2.

The controller 104 determines whether the first page is empty (e.g., indicating that the controller 104 did not write to the first page before the UGSD). If the controller 104 determines the first page is empty, the controller 104 accesses a page of the memory block 302-2 between the first memory address of the memory block 302-2 and the memory address corresponding to the first page. For example, the controller 104 may access a page having a memory address at or near the middle of the memory addresses between the first memory address and the memory address corresponding to the first page. The controller 104 may continue to search for the last good page of the memory block 302-2, as will be described.

If the controller 104 determines that the first page is not empty (e.g., indicating that the first page was written before the UGSD), the controller 104 reads the page header information stored in the page header of the first page to determine the number of write operations remaining in the queue after the first page was written.

The controller 104 determines whether the number of operations remaining in the queue is 0. If the controller 104 determines that the number of operations remaining in the queue is 0 (e.g., indicating that when the first page was written, there were no operations remaining in the queue), the controller 104 determines whether the page that follows the first page is empty. If the controller 104 determines that the page that follows the first page is empty, the controller 104 determines that the first page is the last good page for the memory block 302-2. The controller 104 may continue programming the memory block 302-2, according to commands received from the host 106, at the page that follows the first page.

If the controller 104 determines that the page that follows the first page is not empty, the controller 104 determines whether the page that follows the first page is the last page in the memory block 302-2. If the controller 104 determines that the page that follows the first page is the last page in the memory block 302-2, the controller 104 determines that the memory block 302-2 is programmed and the controller 104 updates the information stored in persistent memory to indicate that programming of the memory block 302-2 is complete. If the controller 104 determines that the page that follows the first page is not the last page in the memory block 302-2, the controller 104 continues, as will be described.

If the controller 104 determines that the number of operations remaining in the queue at the first page is not 0, the controller 104 determines whether the number of write operations remaining in the queue at the first page is above a threshold. The threshold may include a number of operations, such as 1 operation, 2 operations, 4 operations, 6 operations, or any suitable number of operations. The value of the threshold may correspond to the size of the storage system 102. For example, the value of threshold may be relatively large when the storage system 102 includes a relatively large number of memory blocks, memory planes, and/or memory dies. If the controller 104 determines that the number of write operations remaining in the queue at the first page is below the threshold (e.g., the number of operations in the queue is small enough, such that the controller 104 may perform the binary search may be substantially optimal), the controller 104 finds the last good page in the memory block 302-2 by performing a binary search, as described.

Conversely, if the controller 104 determines that the number of write operations remaining in the queue at the first page is above the threshold, the controller 104 accesses a second page (e.g., having a memory address greater than the memory address of the first page) of the memory block 302-2 using the number of write operations remaining in the queue at the first page. For example, the number of memory addresses between the first page and the second page corresponds to the number of write operations remaining in the queue at the first page. The controller 104 determines whether the second page is empty. If the controller 104 determines that the second page is empty, the controller 104 finds the last good page for the memory block 302-2 by performing a binary search between the memory address corresponding to the first page and the memory address corresponding to the second page.

Conversely, if the controller 104 determines that the second page is not empty, the controller 104 determines whether the second page is the last page in the memory block 302-2. If the controller 104 determines that the second page is the last page in the memory block 302-2, the controller 104 determines that programming of the memory block 302-2 was complete before the UGSD. The controller 104 may then update the information stored in persistent memory to indicate that programming of the memory block 302-2 is complete. The controller 104 may continue programming pages in others of the memory blocks 302-3 to 302-N, according to the commands received from the host 106.

Conversely, if the controller 104 determines that the second page is not the last page of the memory block 302-2, the controller 104 reads the page header information stored in the page header of the second page. The controller 104 determines the number of operations remaining in the queue at the second page using the page header information. The controller 104 continues, as described, until the controller 104 finds the last good page of the memory block 302-2. When the controller 104 finds the last good page of the memory block 302-2, the controller 104 may continue programming the memory block 302-2 at the page following the last good page (e.g., the next page to write follows the last good page).

In some embodiments, the storage system 102 may include a plurality of memory planes, each including a plurality of memory blocks, as described. The controller 104 may be configured to find a last good page for each of the plurality of memory planes. For example, the controller 104 finds a last good page of a memory block, such as one of the memory blocks 302-1 to 302-N, corresponding to a first memory plane. In some embodiments, the controller finds the last good page of the memory block corresponding to the first memory plane by performing a binary search. In some embodiments, the controller 104 finds the last good page of the memory block corresponding to the first memory plane using page header information stored in page headers of respective pages of the memory block, as described.

The plurality of memory planes may be independently programmed or programmed in parallel. If the plurality of memory planes are programmed independently, the controller 104 may find a last good page for independently for each of the memory blocks corresponding to respective memory planes, as described. If the plurality of memory planes are programmed in parallel, the controller 104 may find a last good page for other memory planes of the plurality of memory planes using the last good page of the memory block corresponding to the first memory plane.

For example, when the plurality of memory planes are programmed in parallel, corresponding memory pages of memory blocks for respective memory planes are programmed at substantially the same time. However, due to inherent latency in the storage system 102, a page of a memory block corresponding the first memory plane may be programmed slightly before or after a corresponding page in a memory block of a second memory plane. Accordingly, a last good page of a memory block of the second memory plane may be one or two pages before or after the last good page of the memory block of the first memory plane.

In order to find the last good page for the memory block of the second memory plane, the controller 104 uses the memory address corresponding to the last good page of the memory block of the first memory plane plus or minus a delta number of pages. The delta number of pages may correspond to the inherent latency of the storage system 102. For example, the delta number of pages may include 1, 2, 4, 6, or any suitable number of pages. The controller 104 may search the delta number of pages in the memory block of the second memory plane before the memory address corresponding to the last good page in the memory block of the first memory plane and/or the delta number of pages in the memory block of the second memory plane after the memory address corresponding to the last good page in the memory block of the first memory plane. The controller 104 may continue for other memory planes of the plurality of memory planes, as described.

In some embodiments, the storage system 102 may include a plurality of memory dies 110-1 to 110-N, each including a plurality of memory blocks, as described. The controller 104 may be configured to find a last good page for each of the plurality of memory dies 110-1 to 110-N. For example, the controller 104 finds a last good page of a memory block, such as one of the memory blocks 302-1 to 302-N, corresponding to a first memory die 110-1. In some embodiments, the controller finds the last good page of the memory block corresponding to the first memory die 110-1 by performing a binary search. In some embodiments, the controller 104 finds the last good page of the memory block corresponding to the first memory die 110-1 using page header information stored in page headers of respective pages of the memory block, as described.

The plurality of memory dies 110-1 to 110-N may be independently programmed or programmed in parallel. If the plurality of memory dies 110-1 to 110-N are programmed independently, the controller 104 may find a last good page independently for each of the memory blocks corresponding to respective memory dies 110-1 to 110-N, as described. If the plurality of memory dies 110-1 to 110-N are programmed in parallel, the controller 104 may find a last good page for other memory dies 110-2 to 110-N using the last good page of the memory block corresponding to the first memory die 110-1.

For example, when the plurality of memory dies 110-1 to 110-N are programmed in parallel, corresponding memory pages of memory blocks for respective memory dies 110-1 to 110-N are programmed at substantially the same time. However, due to inherent latency in the storage system 102, a page of a memory block corresponding the first memory die 110-1 may be programmed slightly before or after a corresponding page in a memory block of a second memory die 110-2, and so on. Accordingly, a last good page of a memory block of the second memory die 110-2 may be one or two pages before or after the last good page of the memory block of the first memory die 110-1.

In order to find the last good page for the memory block of the second memory die 110-2, the controller 104 uses the memory address corresponding to the last good page of the memory block of the first memory die 110-1 plus or minus a delta number of pages, as described. The controller 104 may search the delta number of pages in the memory block of the second memory die 110-2 before the memory address corresponding to the last good page in the memory block of the first memory die 110-1 and/or the delta number of pages in the memory block of the second memory die 110-2 after the memory address corresponding to the last good page in the memory block of the first memory die 110-1. The controller 104 may continue for other memory dies 110-3 to 110-N, as described.

In some embodiments, the storage system 102 may include a plurality of memory dies 110-1 to 110-N, each including a plurality of memory planes that each include a plurality of memory blocks, as described. The controller 104 may be configured to find a last good page for each memory plane of each of the plurality of memory dies 110-1 to 110-N. For example, the controller 104 finds a last good page of a memory block of a first memory plane, such as one of the memory blocks 302-1 to 302-N, corresponding to a first memory die 110-1. In some embodiments, the controller finds the last good page of the memory block of the first memory plane corresponding to the first memory die 110-1 by performing a binary search. In some embodiments, the controller 104 finds the last good page of the first memory block of the first memory plane corresponding to the first memory die 110-1 using page header information stored in page headers of respective pages of the memory block, as described.

The controller 104 may find last good pages for memory blocks of each memory plane corresponding to the first memory die 110-1 using the last good page of the memory block of the first memory plane corresponding to the first memory die 110-1 and the delta number of pages, as described. The controller 104 may then use the last good pages for the memory blocks of each memory plane corresponding to the first memory die 110-1 and the delta number of pages to find last good pages of memory blocks of each memory plane corresponding to respective ones of the memory dies 110-2 to 110-N, as described.

In some embodiments, the controller 104 may perform the methods described herein. However, the methods described herein as performed by the controller 104 are not meant to be limiting, and any type of software executed on a controller can perform the methods described herein without departing from the scope of this disclosure. For example, a controller such as a processor executing software within the host 106 or firmware within the storage system 102 (e.g., stored on ROM 232 or NVM memory block 110) can perform the methods described herein.

Figure 5:
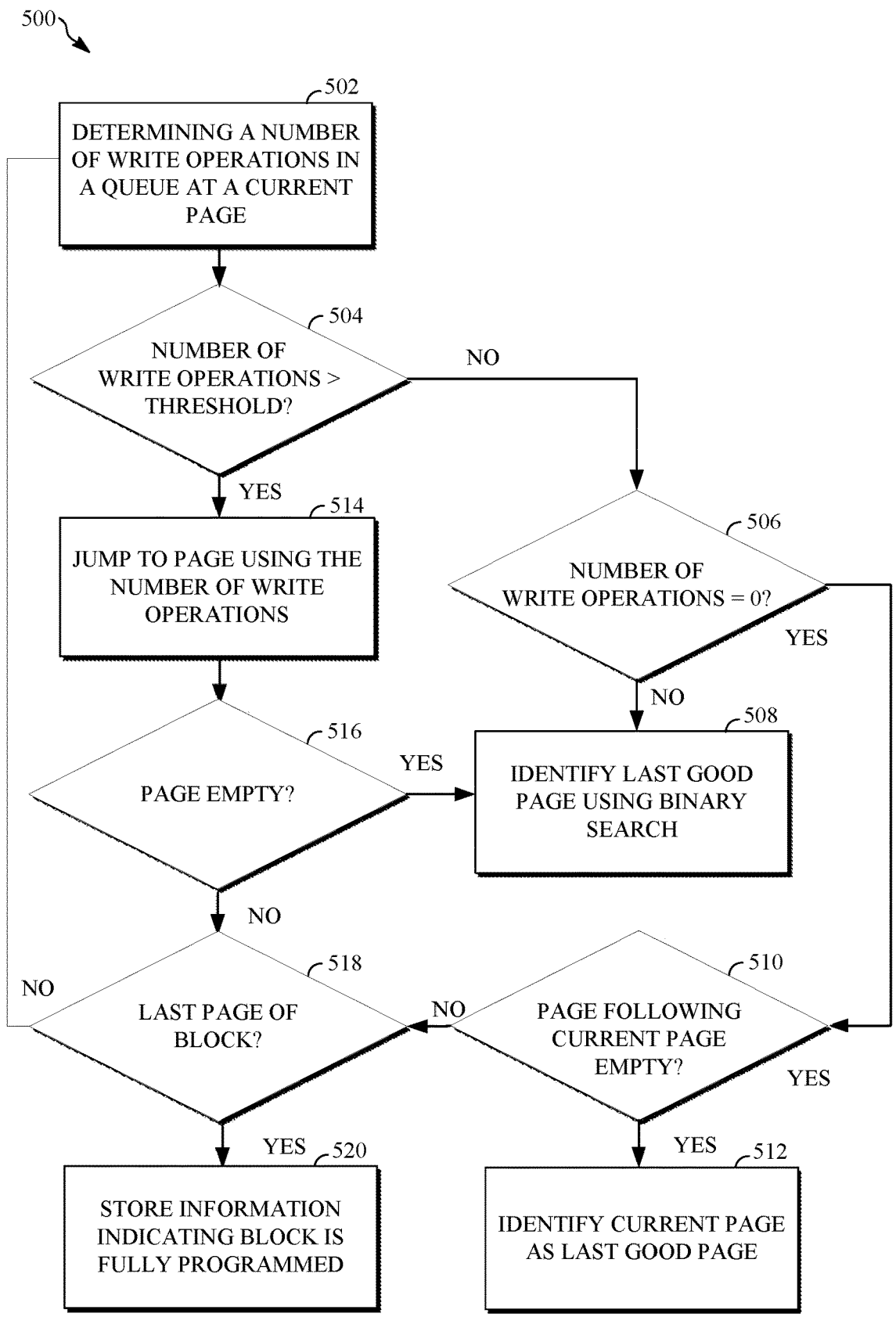
FIG. 5 is a flow diagram illustrating a find last good page method according to the principles of the present disclosure.

FIG. 5 generally illustrates a flow diagram illustrating a find last good page method 500 according to the principles of the present disclosure. At 502, the method 500 determines a number of write operations in a queue at a current page. As described, the controller 104 retrieves information from persistent memory to determine the last memory block of the storage system 102 to be programmed before a UGSD (e.g., such as the memory block 302-1). The controller 104 then accesses a first page of the memory block (e.g., the memory block 302-2) that follows the last memory block to be programmed. The controller 104 determines the number of write operations in the queue of the first page using the page header information stored in the page header of the first page.

At 504, the method 500 determines whether the number of write operations in the queue at the current page is above the threshold. As described, the controller 104 determines whether the number of write operations in the queue at the first page is above the threshold. If the controller 104 determines that the number of write operations in the queue at the first page is not above the threshold, the method 500 continues at 506. If the controller 104 determines that the number of write operations in the queue at the first page is above the threshold, the method 500 continues at 514.

At 506, the method 500 determines whether the number of write operations of the queue at the current page is 0. As described, the controller 104 determines whether the number of write operations of the queue at the first page is 0. If the controller 104 determines that the number of write operations of the queue at the first page is not 0, the method 500 continues at 508. If the controller 104 determines that the number of write operations of the queue at the first page is 0, the method 500 continues at 510.

At 508, the method 500 identifies a last good page using a binary search. As described, the controller 104 identifies the last good page of the first memory block by performing a binary search between first memory address of the memory block 302-2 and the memory address corresponding to the first page of the memory block 302-2.

At 510, the method 500 determines whether the page following the current page is empty. As described, the controller 104 determines whether the page following the first page is empty. If the controller 104 determines that the page following the first page is empty, the method 500 continues at 512. If the controller 104 determines that the page following the first page is not empty, the method continues at 518.

At 512, the method 500 identifies the current page as the last good page. As described, the controller 104 identifies the first page as the last good page of the memory block 302-2. The controller 104 may continue programming at the page following the last good page, according to commands received from the host 106.

At 514, the method 500 jumps to a page using the number of write operations. As described, the controller 104 may access a second page of the memory block 302-2. The number of memory addresses between the first page and the second page corresponds to the number of write operations in the queue at the first page. At 516, the method determines whether the page is empty. As described, the controller 104 determines whether the second page is empty. If the controller 104 determines that the second page is empty, the method 500 continues at 508. If the controller 104 determines that the second page is not empty, the method 500 continues at 518.

At 518, the method 500 determines whether the page is the last page in the memory block. As described, the controller 104 determines whether the second page is the last page of the memory block 302-2. If the controller 104 determines that the second page is not the last page of the memory block 302-2, the method 500 continues at 502. If the controller 104 determines that the second page is the last page in the memory block 302-2, the method 500 continues at 520. At 520, the method 500 stores information indicating the memory block is fully programmed. As described, the controller 104 updates the information stored in persistent memory indicating that programming of the memory block 302-2 is complete. The controller 104 may continue programming other memory blocks according to the commands received from the host 106.

Figure 6:
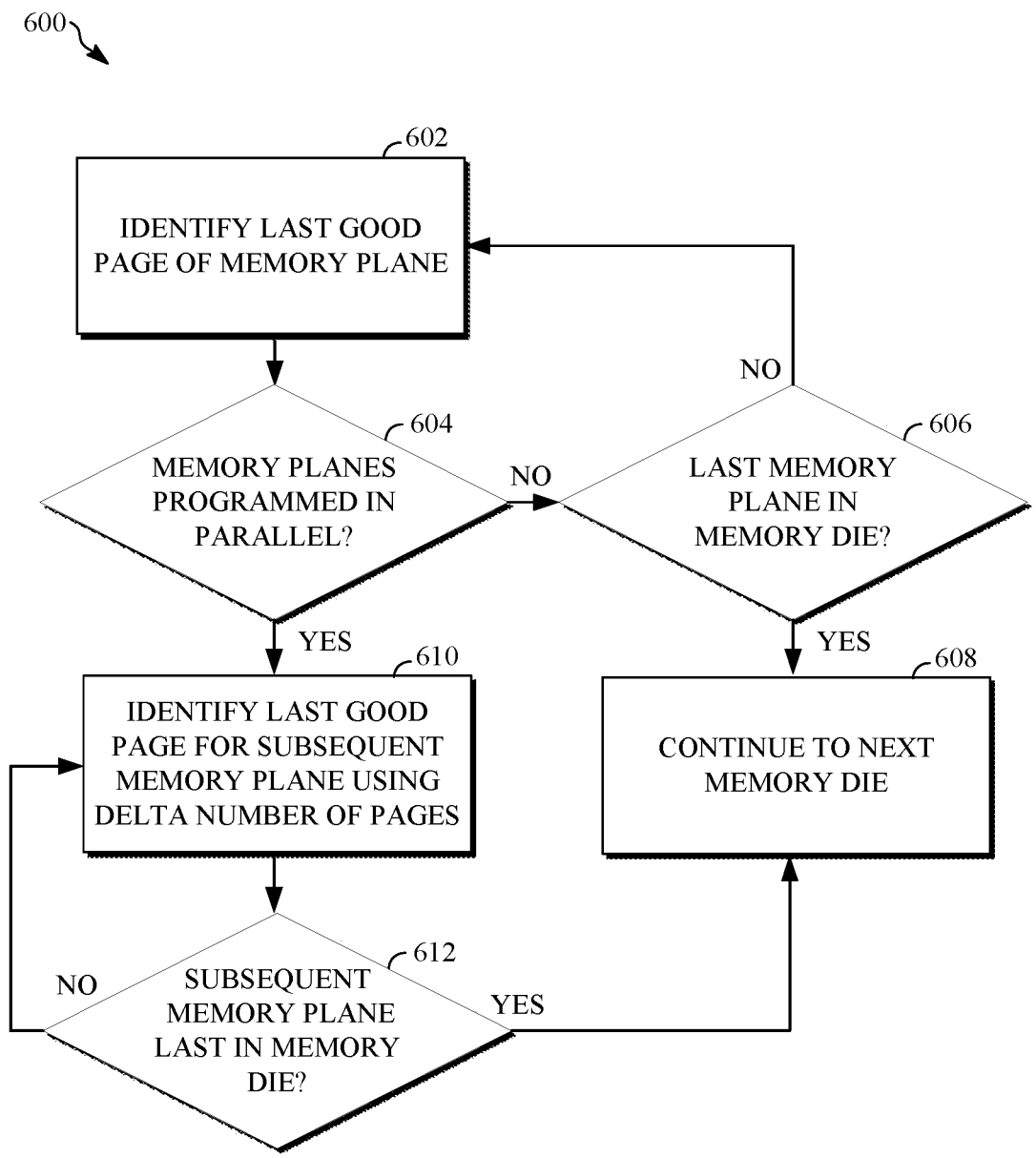
FIG. 6 is a flow diagram illustrating an alternative find last good page method according to the principles of the present disclosure.

FIG. 6 generally illustrates a flow diagram illustrating an alternative find last good page method 600 according to the principles of the present disclosure. At 602, the method 600 identifies a last good page of a memory plane. As described, the storage system 102 may include a plurality of memory planes. The controller 104 identifies a last good page for a memory block of a first memory plane (e.g., using a binary search and/or using page header information, as described). At 604, the method 600 determines whether the memory planes are programmed in parallel. If the memory planes are programmed independently, the method 600 continues at 606. If the memory planes are programmed in parallel, the method 600 continues at 610.

At 606, the method 600 determines whether the memory plane is the last memory plane in the memory die. As described, the controller 104 determines whether the first memory plane is the last memory plane in a corresponding memory die, such as the memory die 110-1. If the controller 104 determines that the first memory plane is not the last memory plane in the memory die 110-1, the method 600 continues at 602. If the controller 104 determines that the first memory plane is the last memory plane in the memory die 110-1, the method continues at 608. At 608, the method 600 continues to the next memory die. As describe, the storage system 102 may include a plurality of memory dies 110-1 to 110-N. Accordingly, the controller 104 may continue to find a last good page for other memory dies 110-2 to 110-N, as described.

At 610, the method 600 identifies a last good page for a subsequent memory plane using a delta number of pages. As described, the controller 104 finds a last good page for a second memory plane using the last good page for the first memory plane and the delta number of pages. At 612, the method 600 determines whether subsequent memory plane is the last memory plane in the memory die. As described, the controller 104 determines whether the second memory plane is the last memory plane in the memory die 110-1. If the controller 104 determines that the second memory plane is not the last memory plane in the memory die 110-1, the method 600 continues at 610. If the controller 104 determines that the second memory plane is the last memory plane in the memory die 110-1, the method 600 continues at 608.

Figure 7:
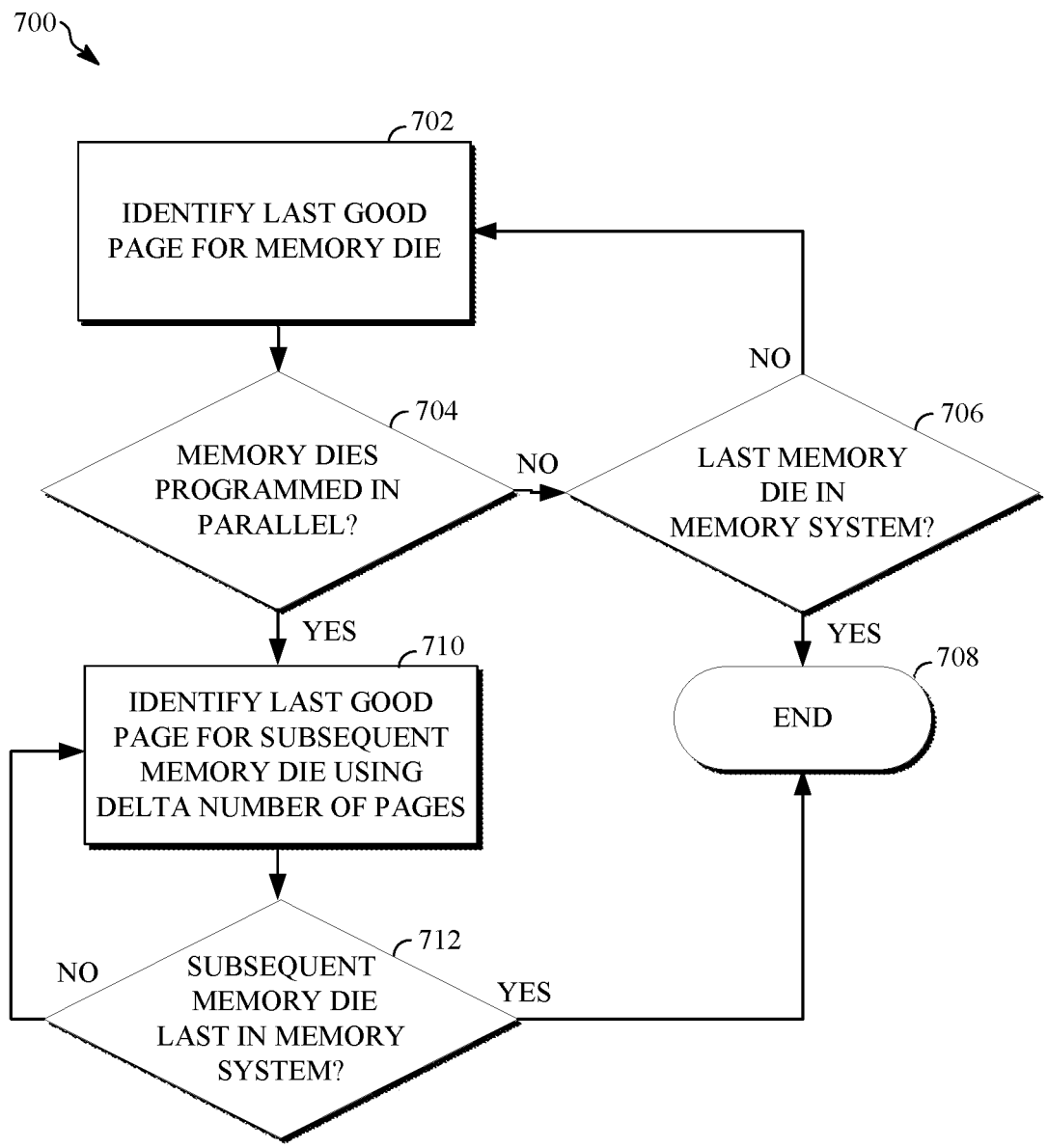
FIG. 7 is a flow diagram illustrating an alternative find last good page method according to the principles of the present disclosure.

FIG. 7 generally illustrates a flow diagram illustrating an alternative find last good page method 700 according to the principles of the present disclosure. At 702, the method 700 identifies a last good page of a memory die. As described, the storage system 102 may include a plurality of memory dies 110-1 to 110-N. The controller 104 identifies a last good page for a memory block of a first memory die 110-1 (e.g., using a binary search and/or using page header information, as described). At 704, the method 700 determines whether the memory dies are programmed in parallel. If the memory dies 110-1 to 110-N are programmed independently, the method 700 continues at 706. If the memory dies 110-1 to 110-N are programmed in parallel, the method 700 continues at 710.

At 706, the method 700 determines whether the memory die is the last memory die in the memory system. As described, the controller 104 determines whether the first memory die 110-1 is the last memory die in the storage system 102. If the controller 104 determines that the first memory die 110-1 is not the last memory die in the storage system 102, the method 700 continues at 702. If the controller 104 determines that the first memory die 110-1 is the last memory die in the storage system 102, the method ends at 708.

At 710, the method 700 identifies a last good page for a subsequent memory die using a delta number of pages. As described, the controller 104 finds a last good page for a second memory die 110-2 using the last good page for the first memory die 110-1 and the delta number of pages. At 712, the method 700 determines whether subsequent memory die is the last memory die in the memory system. As described, the controller 104 determines whether the second memory die 110-2 is the last memory die in the storage system 102. If the controller 104 determines that the second memory die 110-2 is not the last memory die in the storage system 102, the method 700 continues at 710. If the controller 104 determines that the second memory die 110-2 is the last memory die in the storage system 102, the method 700 ends at 708.

In some embodiments, a method for finding a last good page in a memory system includes determining a first number of write operations in a first queue at a first page in a memory block of the memory system. The method also includes determining whether the first number of write operations in the first queue is above a threshold. The method also includes based on a determination that the first number of write operations in the first queue is above the threshold, determining whether a second page in the memory block is empty. The method also includes identifying, based on a determination that the second page is empty, the last good page in the memory block using a binary search between the first page and the second page.

In some embodiments, the first page includes a middle page of the memory block. In some embodiments, a number of pages between the first page and the second page corresponds to the first number of write operations in the first queue. In some embodiments, the method also includes determining, based on a determination that the second page is not empty, a second number of write operations in a second queue at the second page. In some embodiments, the method also includes, based on a determination that the second number of write operations in the second queue equals 0, determining whether a page that follows the second page is empty. In some embodiments, the method also includes determining that the second page is the last good page of the memory block based on a determination that the page that follows the second page is empty. In some embodiments, the method also includes determining, based on a determination that the page that follows the second page is not empty, a third number of write operations in a third queue at the page that follows the second page. In some embodiments, the method also includes, based on a determination that the second number of write operations in the second queue does not equal 0, determining whether the second number of write operations in the second queue is above the threshold. In some embodiments, the method also includes determining, based on a determination that the second number of write operations in the second queue is above the threshold, a third number of write operations at a third page of the memory block. In some embodiments, the method also includes identifying, based on a determination that the second number of write operations in the second queue is below the threshold, the last good page in the memory block using a binary search.

In some embodiments, a memory system that includes a non-volatile storage having an array of memory blocks and a controller in communication with the memory blocks. The controller is configured to: determine a first number of write operations in a first queue at a first page in a memory block of the memory blocks determine whether the first number of write operations in the first queue is above a threshold; based on a determination that the first number of write operations in the first queue is above the threshold, determine whether a second page in the memory block is empty; and identify, based on a determination that the second page is empty, the last good page in the memory block using a binary search between the first page and the second page.

In some embodiments, the first page includes a middle page of the memory block. In some embodiments, a number of pages between the first page and the second page corresponds to the first number of write operations in the first queue. In some embodiments, the controller is further configured to determine, based on a determination that the second page is not empty, a second number of write operations in a second queue at the second page. In some embodiments, the controller is further configured to, based on a determination that the second number of write operations in the second queue equals 0, determine whether a page that follows the second page is empty. In some embodiments, the controller is further configured to determine that the second page is the last good page of the memory block based on a determination that the page that follows the second page is empty. In some embodiments, the controller is further configured to determine, based on a determination that the page that follows the second page is not empty, a third number of write operations in a third queue at the page that follows the second page. In some embodiments, the controller is further configured to, based on a determination that the second number of write operations in the second queue does not equal 0, determine whether the second number of write operations in the second queue is above the threshold. In some embodiments, the controller is further configured to determine, based on a determination that the second number of write operations in the second queue is above the threshold, a third number of write operations at a third page of the memory block. In some embodiments, the controller is further configured to identify, based on a determination that the second number of write operations in the second queue is below the threshold, the last good page in the memory block using a binary search.

In some embodiments, a method for finding a last good page for each memory die in a memory system having multiple memory dies includes determining a first number of write operations in a first queue at a first page in a first memory block of a first memory die. The method also includes determining whether the first number of write operations in the first queue is above a threshold. The method also includes based on a determination that the first number of write operations in the first queue is above the threshold, determining whether a second page in the first memory block of the first memory die is empty. The method also includes based on a determination that the second page is empty, identifying a last good page in the first memory block of the first memory die using a binary search between the first page and the second page. The method also includes based on a determination that the second page is not empty, identifying the last good page in the first memory block of the first memory die using a second number of write operations in a second queue at the second page in the first memory block of the first memory die. The method also includes identifying a last good page in a second memory block of a second memory die using the last good page in the first memory block of the first memory die and a delta number of pages.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. In the preceding description and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module. In some embodiments, the controller 104 is implemented within the host 106 can be configured with hardware and/or firmware to perform the various functions described herein.

"Controller" shall mean individual circuit components, an application-specific integrated circuit (ASIC), a microcontroller with controlling software, a digital signal processor (DSP), a processor with controlling software, a field programmable gate array (FPGA), or combinations thereof.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for finding a last good page in a memory system, the method comprising:
determining a first determination of a first number of write operations in a first queue at a first page in a memory block of the memory system;
determining a second determination that the first number of write operations in the first queue is above a threshold;
based on the second determination that the first number of write operations in the first queue is above the threshold, determining a third determination of whether a second page in the memory block is empty or not empty;
either:
identifying, based on the third determination that the second page is empty, the last good page in the memory block using a binary search between the first page and the second page, or
determining, based on the third determination that the second page is not empty, a fourth determination of a second number of write operations in a second queue at the second page;
determining a fifth determination that the second number of write operations in the second queue is below the threshold; and
based on the fourth determination that the second number of write operations in the second queue equals 0, determining a sixth determination of whether a page that follows the second page is empty.

2. The method of claim 1, wherein the first page includes a middle page of the memory block.

3. The method of claim 1, wherein a number of pages between the first page and the second page corresponds to the first number of write operations in the first queue.

4. The method of claim 1, further comprising determining that the second page is the last good page of the memory block based on a determination that the page that follows the second page is empty.

5. The method of claim 1, further comprising determining, based on a determination that the page that follows the second page is not empty, a third number of write operations in a third queue at the page that follows the second page.

6. The method of claim 1, further comprising, based on a determination that the second number of write operations in the second queue does not equal 0, determining whether the second number of write operations in the second queue is above the threshold.

7. The method of claim 6, further comprising determining, based on a determination that the second number of write operations in the second queue is above the threshold, a third number of write operations at a third page of the memory block.

8. The method of claim 6, further comprising identifying, based on a determination that the second number of write operations in the second queue is below the threshold, the last good page in the memory block using a binary search.

9. A controller comprising:
a bus interface configured to determine a first determination of a first number of write operations in a first queue at a first page in a memory block of a plurality of memory blocks; and
a processor configured to:

determine a second determination that the first number of write operations in the first queue is above a threshold;

based on the second determination that the first number of write operations in the first queue is above the threshold, determine a third determination of whether a second page in the memory block is empty or not empty;

either:
  identify, based on the third determination that the second page is empty, a last good page in the memory block using a binary search between the first page and the second page, or
  determine, based on the third determination that the second page is not empty, a fourth determination of a second number of write operations in a second queue at the second page;

determine a fifth determination that the second number of write operations in the second queue is below the threshold; and based on the fourth determination that the second number of write operations in the second queue equals 0, determine a sixth determination of whether a page that follows the second page is empty.

10. The controller of claim 9, wherein the first page includes a middle page of the memory block.

11. The controller of claim 9, wherein a number of pages between the first page and the second page corresponds to the first number of write operations in the first queue.

12. The controller of claim 9, wherein the processor is further configured to determine that the second page is the last good page of the memory block based on a determination that the page that follows the second page is empty.

13. The controller of claim 9, wherein the processor is further configured to determine, based on a determination that the page that follows the second page is not empty, a third number of write operations in a third queue at the page that follows the second page.

14. The controller of claim 9, wherein the processor is further configured to, based on a determination that the second number of write operations in the second queue does not equal 0, determine whether the second number of write operations in the second queue is above the threshold.

15. The controller of claim 14, wherein the processor is further configured to determine, based on a determination that the second number of write operations in the second queue is above the threshold, a third number of write operations at a third page of the memory block.

16. A method for finding a last good page for each memory die in a memory system having multiple memory dies, the method comprising:

determining a first determination of a first number of write operations in a first queue at a first page in a first memory block of a first memory die;

determining a second determination that the first number of write operations in the first queue is above a threshold;

based on the second determination that the first number of write operations in the first queue is above the threshold, determining a third determination of whether a second page in the first memory block of the first memory die is empty or not empty;

either:
  based on the third determination that the second page is empty, identifying a last good page in the first memory block of the first memory die using a binary search between the first page and the second page, or
  based on the third determination that the second page is not empty, identifying the last good page in the first memory block of the first memory die using a second number of write operations in a second queue at the second page in the first memory block of the first memory die;

determining a fourth determination that the second number of write operations in the second queue is below the threshold;

based on a fifth determination that the second number of write operation in the second queue equals 0, determining a sixth determination of whether a page that follows the second page is empty; and identifying a last good page in a second memory block of a second memory die using the last good page in the first memory block of the first memory die and a delta number of pages, wherein the delta number of pages corresponds to an inherent latency of the memory system.

* * * * *